US007059588B2

(12) United States Patent
Goulet

(10) Patent No.: US 7,059,588 B2
(45) Date of Patent: Jun. 13, 2006

(54) POWERED STRAP WINDER

(75) Inventor: Hector Goulet, Windsor, CT (US)

(73) Assignee: HECT-OR-OLL, LLC, Windsor, CT (US)

( * ) Notice: Subject to any disclaimer, the term of this patent is extended or adjusted under 35 U.S.C. 154(b) by 0 days.

(21) Appl. No.: 10/609,072

(22) Filed: Jun. 27, 2003

(65) Prior Publication Data

US 2004/0007701 A1 Jan. 15, 2004

Related U.S. Application Data

(60) Provisional application No. 60/392,120, filed on Jun. 27, 2002.

(51) Int. Cl.
*B66D 1/00* (2006.01)

(52) U.S. Cl. ..................................... 254/323

(58) Field of Classification Search ............... 254/213, 254/217–219, 221, 241, 323; 242/532.6, 242/390, 390.5, 390.8, 394
See application file for complete search history.

(56) References Cited

U.S. PATENT DOCUMENTS

| 1,804,585 | A | | 5/1931 | Barner et al. | |
|---|---|---|---|---|---|
| 2,228,370 | A | | 1/1941 | Schultz | 299/78 |
| 2,673,068 | A | * | 3/1954 | Schinker | 410/103 |
| 2,815,179 | A | | 12/1957 | Keljik | 242/67.1 |
| 3,428,331 | A | * | 2/1969 | Morgan et al. | 410/100 |
| 3,731,887 | A | | 5/1973 | Wheeler | 242/96 |
| 3,954,226 | A | * | 5/1976 | Pickering | |
| 4,133,496 | A | * | 1/1979 | Zetah | |
| 4,161,298 | A | * | 7/1979 | Davis | |
| 4,198,010 | A | * | 4/1980 | Knapp | |
| 4,255,740 | A | * | 3/1981 | Ferrie | 340/146.2 |
| 4,266,740 | A | | 5/1981 | Ramos et al. | 242/86.52 |
| 4,290,584 | A | * | 9/1981 | Eckels et al. | 254/380 |
| 4,311,288 | A | * | 1/1982 | Galland | |
| 4,390,141 | A | | 6/1983 | Webster | 242/86.5 R |
| 4,425,000 | A | | 1/1984 | Keck, Jr. | 294/165 |
| 4,592,519 | A | | 6/1986 | Peacock | 242/86 |
| 5,217,208 | A | * | 6/1993 | Stephenson | |
| D360,354 | S | | 7/1995 | Sutton et al. | D8/359 |

(Continued)

OTHER PUBLICATIONS

PCT International Search Report for PCt/US03/20087, dated Mar. 15, 2004; Applicant: HECT-OR-OLL, LLC; 4 pages.

(Continued)

*Primary Examiner*—Emmanuel M Marcelo
(74) *Attorney, Agent, or Firm*—Cantor Colburn LLP

(57) ABSTRACT

A strap winder (10) is provided for winding up an elongated strap (58). The strap winder (10) is actuated by a power-operated driver, e.g., a pneumatic torque or a wrench (12) or an electric, pneumatic or hydraulic motor (281) and includes a body (26) and a shaft (28) that is rotatably supported by the body (26). The shaft (28) has, at one end, a slot (52*a*) configured for receipt of a strap (58). The other end of the shaft (28) is configured to connect with the power-operated driver and a guide plate (30) is provided that is supported by the body (26) and extends is a direction that is generally perpendicular to a longitudinal axis of the shaft (28). An optional guard plate (286) is pivotably mounted in parallel relation to guide plate (30) to protect the user from inadvertent contact with the rotating shaft (28) or the strap thereon. When winding is done, the guard plate (286) can be pivoted out of the way so that the coiled strap (58) can be removed from the shaft (28).

14 Claims, 8 Drawing Sheets

U.S. PATENT DOCUMENTS

| | | | | |
|---|---|---|---|---|
| 5,522,582 | A | * | 6/1996 | Dilks .......................... 254/323 |
| 5,524,870 | A | * | 6/1996 | Tallent et al. |
| 5,692,735 | A | * | 12/1997 | Aho et al. |
| 5,794,920 | A | * | 8/1998 | Kronberger ................. 254/361 |
| 5,975,454 | A | | 11/1999 | Potter et al. ................ 242/395 |
| 6,068,210 | A | * | 5/2000 | Risa |
| 6,179,534 | B1 | | 1/2001 | Weckter ..................... 410/103 |
| 6,200,079 | B1 | | 3/2001 | Little ......................... 410/103 |
| 6,286,779 | B1 | * | 9/2001 | Devine |
| D452,953 | S | | 1/2002 | Okkema ..................... D8/359 |
| 6,398,147 | B1 | * | 6/2002 | Fredrickson |
| 6,467,755 | B1 | | 10/2002 | Reilly et al. ................ 254/223 |
| 6,612,793 | B1 | | 9/2003 | Coslovi et al. ............. 410/100 |
| 6,626,621 | B1 | | 9/2003 | Hugg ......................... 410/103 |
| 6,648,262 | B1 | * | 11/2003 | Huffman |
| 6,659,429 | B1 | * | 12/2003 | Shoji |
| 6,685,125 | B1 | * | 2/2004 | Tucci ...................... 242/390.8 |
| 6,742,972 | B1 | * | 6/2004 | Brunet ....................... 410/103 |

OTHER PUBLICATIONS

PCt International Preliminary Examination Report for PCT/US03/20087, dated Jul. 21, 2004; Applicant: HECT-OR-OLL, LLC; 7 pages.

\* cited by examiner

POWERED STRAP WINDER

CROSS-REFERENCE TO RELATED APPLICATION

This application claims the benefit of U.S. provisional application No. 60/392,120, filed Jun. 27, 2002.

BACKGROUND OF THE INVENTION

1. Field of the Invention

The present invention relates generally to devices for coiling or winding and, more particularly, the present invention relates to a device that winds straps such as those used for retaining cargo on a trailer of a tractor-trailer.

2. Related Art

Flat bed truck and tractor-trailer truck operators may employ as many as two dozen or so straps to secure cargo. Typically, the straps are composed of a woven fabric comprising a polymeric material such as nylon and include a metallic hook mounted to at least one end. The hooks and straps may be dimensioned from about two to about four inches wide and, generally, the straps may be as long as approximately 15 to 20 feet.

During use of a strap, the end having a hook may be connected to the bed of a truck or trailer and the opposing end may be connected to another strap via a suitable connecting device such as a strap or belt tightener. After the cargo has been transported to a particular destination, the straps and cargo are removed and, thereafter, the straps are preferably coiled or rolled up for storage in a neat and organized manner.

Many operators simply roll up the straps by hand which is a very repetitious and time consuming activity. Also, the repetitious nature of this activity, which may be performed in subzero conditions, may increase the risk of injury to an operator, such as carpal tunnel syndrome.

U.S. Pat. No. 3,954,226 to Pickering, dated May 4, 1976 and entitled "Strap Coiling Mechanism", discloses a hand-held strap coiling device that, as best seen in FIGS. 2 through 4, has a spool and handle mechanism 2 and a handle and guide mechanism 14. The spool and handle mechanism 2 includes a spool having a first cylindrical end 4 and a second split end forming two fingers 6 and 8. A radial crank arm 10 extends from the cylindrical end 4 which terminates in an axially extending handle 12. The handle and guide mechanism 14 includes a hollow cylindrical handle 16 adapted to overlie the cylindrical portion 4 of the spool and a radially extending disc-shaped shield 20. In operation, an end of a strap is placed between the fingers 6 and 8. The user grasps handle 16 and rotates the handle 12 to coil the strap about the spool ends 6 and 8 against the guide 20.

U.S. Pat. No. 5,975,454 to Potter et al, dated Nov. 2, 1999 and entitled "Strap Winder", discloses a strap winder 20 that, as shown in FIGS. 1 and 2, includes a planar oval base 21 and a hand grip 22. A strap guide 24 and a rotatable circular disk 29 that includes a hub 35 and a crank handle 36 are also mounted to the base 21. The hub 35 has two spaced apart sections 35a, 35b with arcuate outer surfaces. A strap 37 to be wound on the strap winder 20 includes a hook 38 that may be engaged with the hub 35. The strap winder 20 is held by the user in one hand and the disk 29 turned with the other hand drawing the strap 37 through guide 24, winding the strap onto the hub 35.

U.S. Pat. No. 6,179,534 to Weckter, dated Jan. 30, 2001 and entitled "Strap Roller Device", discloses a surface mount strap roller device 10. As illustrated in FIGS. 1 and 2, the strap roller device 10 includes a base means 11 having a mounting bracket 12 and a tubular member 15 welded thereto. The tubular member 15 includes a bore 16 into which a take up means 20 including an elongated member 21 is disposed. The elongated member 21 includes a first end 22 having a longitudinally extending slot 24 and a second end 23 that terminates in a handle means 30. In use, an operator inserts an end portion of a cargo strap into the slot 24 of the elongate member 21 and grasps the handle member 34 and rotates the elongate member 21 which takes up the cargo strap in a roll.

Each of the foregoing devices suffers from various deficiencies, including the necessity for arduous manual operation to wind up the strap. Both Pickering and Potter require two hands to simply stabilize and operate the rolling device and thus improper feeding of the strap is likely to occur. Weckter provides no guide for the strap being rolled and requires that the device be mounted, via fasteners, to a "semi-truck trailer".

Accordingly, a need exists for a strap winder that is easy to use, reduces the risk of injury, and does not require manual operation.

SUMMARY OF THE INVENTION

In accordance with the present invention there is provided a strap winder dimensioned and configured to be mounted on a vehicle, the strap winder serving to wind up an elongated strap, e.g., a cargo strap, into a coil. The strap winder comprises a body, a shaft rotatably supported by the body, the shaft having a longitudinal axis and being dimensioned and configured to receive the strap for winding it about the shaft, and a power-operated driver, e.g., a pneumatic motor, an electric motor or a hydraulic motor. The power-operated driver is connected to the shaft to rotate the shaft about its longitudinal axis, and a power connector is provided on the strap winder to connect the power-operated driver to a power source whereby to rotate the shaft to coil the strap onto the shaft.

In another aspect of the present invention, the strap winder is in combination with the vehicle, and the power source comprises one of a pneumatic system, a battery-containing electrical system and a hydraulic system, the power source being associated with the vehicle, and the strap winder being mounted on the vehicle.

Another aspect of the present invention provides that the strap winder is in combination with a vehicle and optionally may be enclosed within a container mounted on the vehicle. The container may comprise, e.g., a weather-sealed box having therein a lockable access door and may further comprise a coupler through which power may be provided from outside the container to driver the strap winder. The container is dimensioned and configured to provide access to the strap winder.

Another aspect of the invention provides the strap winder in combination with a vehicle comprising a truck trailer and a truck cab, and wherein the strap winder is mounted on the truck trailer.

Yet another aspect of the present invention provides a strap winder for winding an elongated strap into a coil, the strap winder comprising a body, a shaft rotatably supported by the body, the shaft having a longitudinal axis and being dimensioned and configured to receive the strap for winding it about the shaft, a guide member mounted on the strap winder in generally perpendicular relation to the longitudinal axis of the shaft, and a power-operated driver connected to the shaft to rotate the shaft about its longitudinal axis.

Other aspects of the present invention provide the following features, alone or in a combination of two or more thereof: the guide member may comprise a guide plate and the strap winder may further comprise a guard plate mounted thereon generally parallel to the guide plate and spaced therefrom to receive the elongated strap between the guard plate and the guide plate; the guard plate may be pivotably mounted for pivoting movement between (1) a safety position in which it is in parallel, spaced relation to the guide plate, and (2) an access position in which it is withdrawn from its safety position to permit removal from the strap winder of a strap coiled about the shaft; and the guard plate may be adjustably mounted on the strap winder whereby the axial distance along the shaft between the guard plate and the guide plate can be varied.

Other aspects of the invention are described below and shown in the appended drawings.

As used herein and in the claims, the term "power-operated driver" means a motor or hand-held power tool which is powered not by muscle but by a power source such as electrical, pneumatic or hydraulic power.

DETAILED DESCRIPTION OF THE INVENTION AND PREFERRED EMBODIMENTS THEREOF

A strap winder in accordance with one embodiment of the present invention is adapted to be driven by, and may include, a power-operated driver such as a powered torque wrench, a pneumatic motor, a hydraulic motor, or an electric motor, to quickly and efficiently wind up straps. The power-operated driver may be either a hand-held power tool or a stationary, permanently mounted motor or other driving device, which is supplied with power from a power source, the latter including the pneumatic, hydraulic or electrical system of a vehicle such as a trailer-truck combination. A stationary motor is preferred over the use of a hand-held power tool because hand-held tools tend to exhibit kick-back, which makes the tool difficult to control. Typically, a power-operated driver includes, or is adapted to be connected to, a control device that activates and/or regulates the action of the power-operated driver. Such a control device may be, e.g., a combination on/off switch and speed control rheostat, a variable air flow valve, etc.

A strap winder according to an embodiment of the present invention may optionally be equipped with a guide plate to contact the edge of the strap being wound into a coil, and may optionally be equipped with a guard plate spaced from the guide plate. The guard plate serves to protect the user against inadvertently touching the rotating shaft or the strap being coiled on it. The guard plate is preferably the same size and shape as the guide plate and is disposed parallel to and spaced from the guide plate, at the end of the shaft. Preferably, the guide plate is mounted, e.g., on a hinge, so that it can be moved from the parallel position to another position in which it will not interfere with removal, or attachment of, a strap on the shaft. Also, the axial distance along the shaft between the guard plate and the guide plate is preferably adjustable, usually by mounting the guard plate for movement parallel to the longitudinal axis of the shaft.

The strap winder may be configured to be mounted on a flat surface or in a support cavity in a flat surface, or it may be mounted in a container and the container may be mounted on a vehicle.

The strap winder may be adapted to be mounted on a motor vehicle, such as a truck, e.g., a tractor-trailer combination in which the trailer may be a flat bed trailer. The strap winder is thus conveniently located to be used to wind into coils cargo straps that are used to secure cargo on the truck. The vehicle may comprise a power source for the power-operated driver, e.g., a vehicle having a strap winder according to this invention may be equipped with the usual pneumatic system, hydraulic system and/or electrical system, to which the power-operated driver can be connected. The power source may derive its power from, or may be replenished and/or supplemented by, the vehicle engine.

Figure 1:
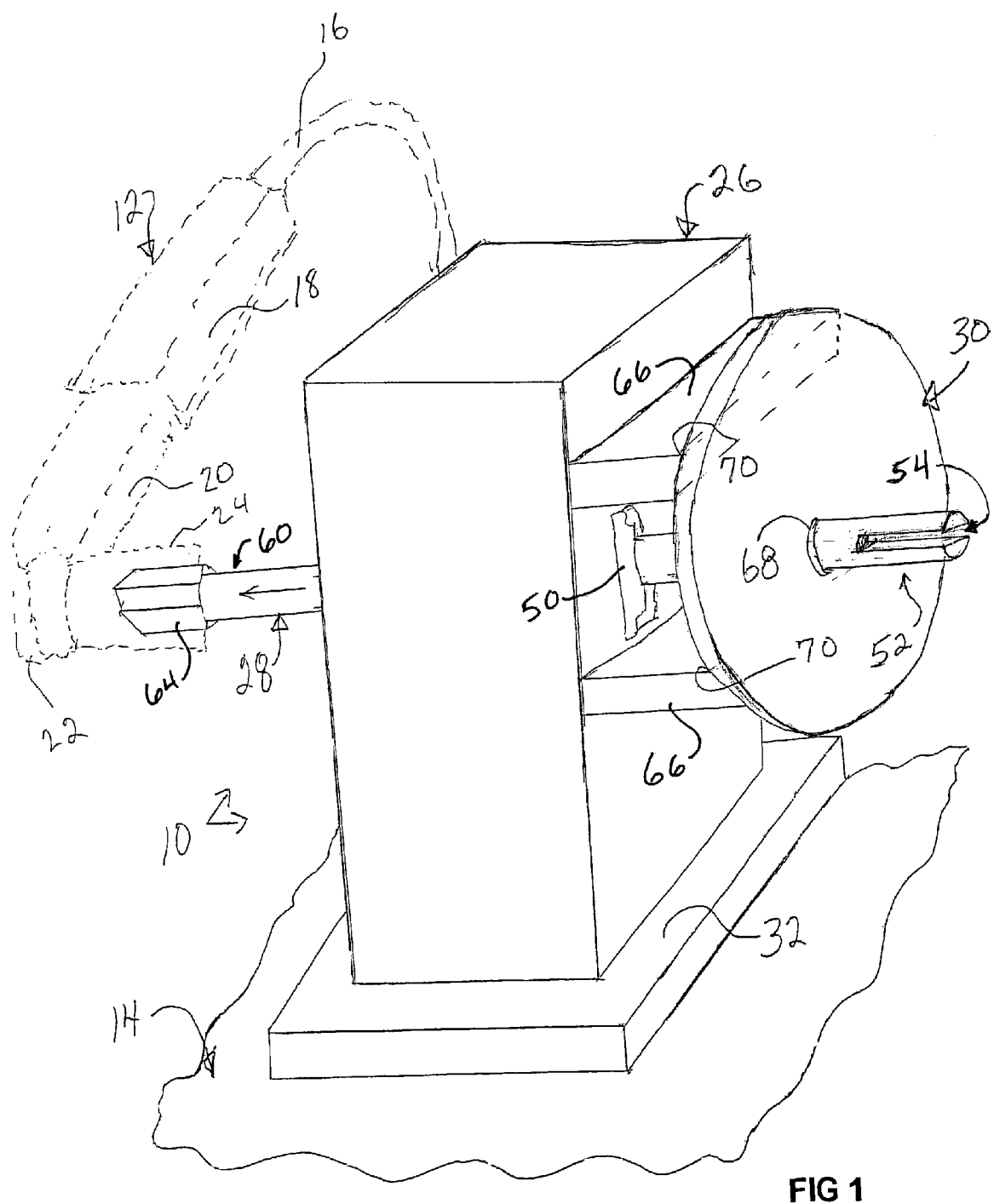
FIG. 1 is a perspective view illustrating a strap winder in accordance with one embodiment of the present invention mounted on a trailer bed and having a pneumatic drive tool, shown in broken lines, attached thereto.
Figure 2:
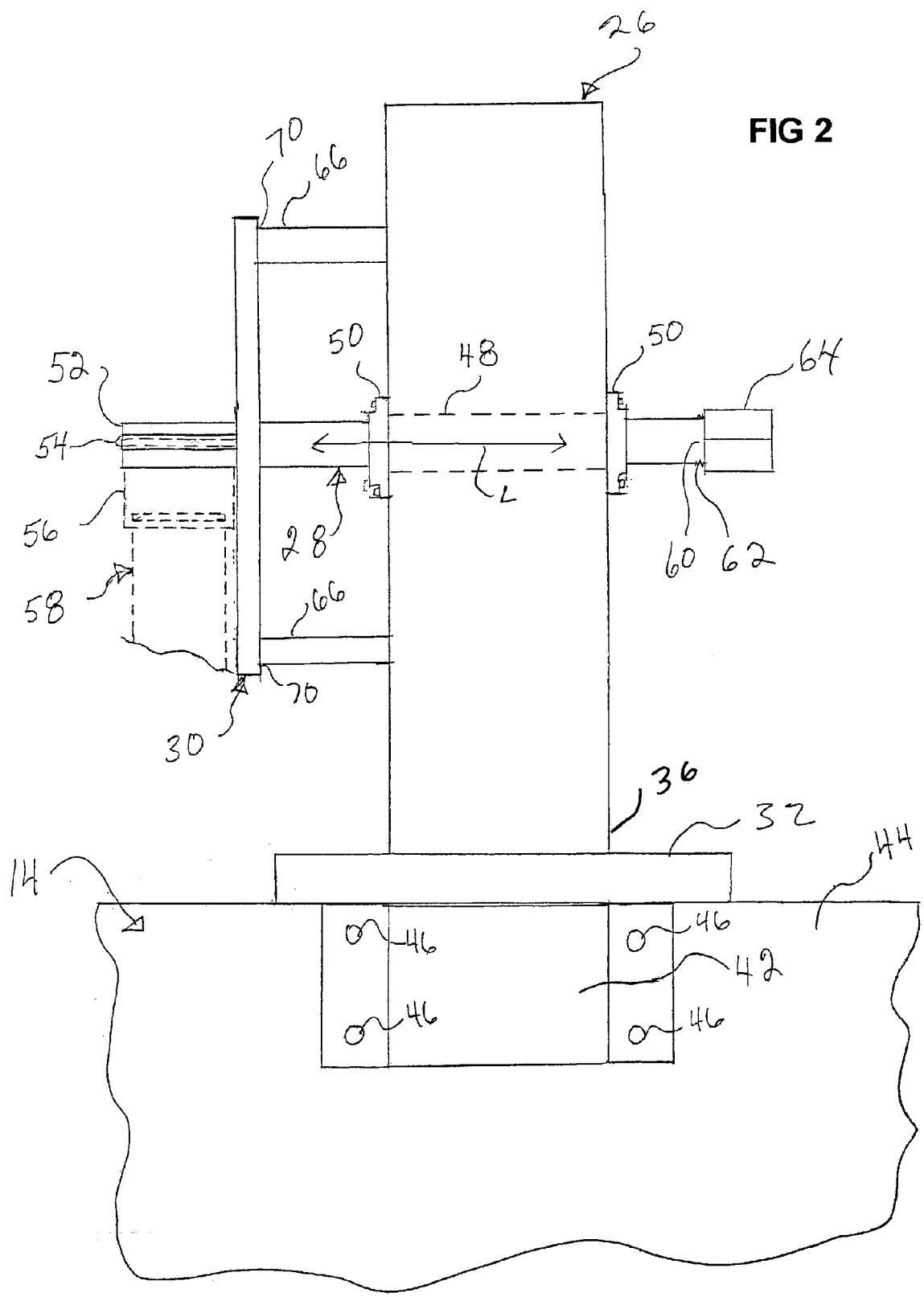
FIG. 2 is a side elevation view of the strap winder of FIG. 1, showing a mounting bracket on the trailer bed in which the strap winder is mounted, and showing in broken lines a strap to be wound.
Figure 3:
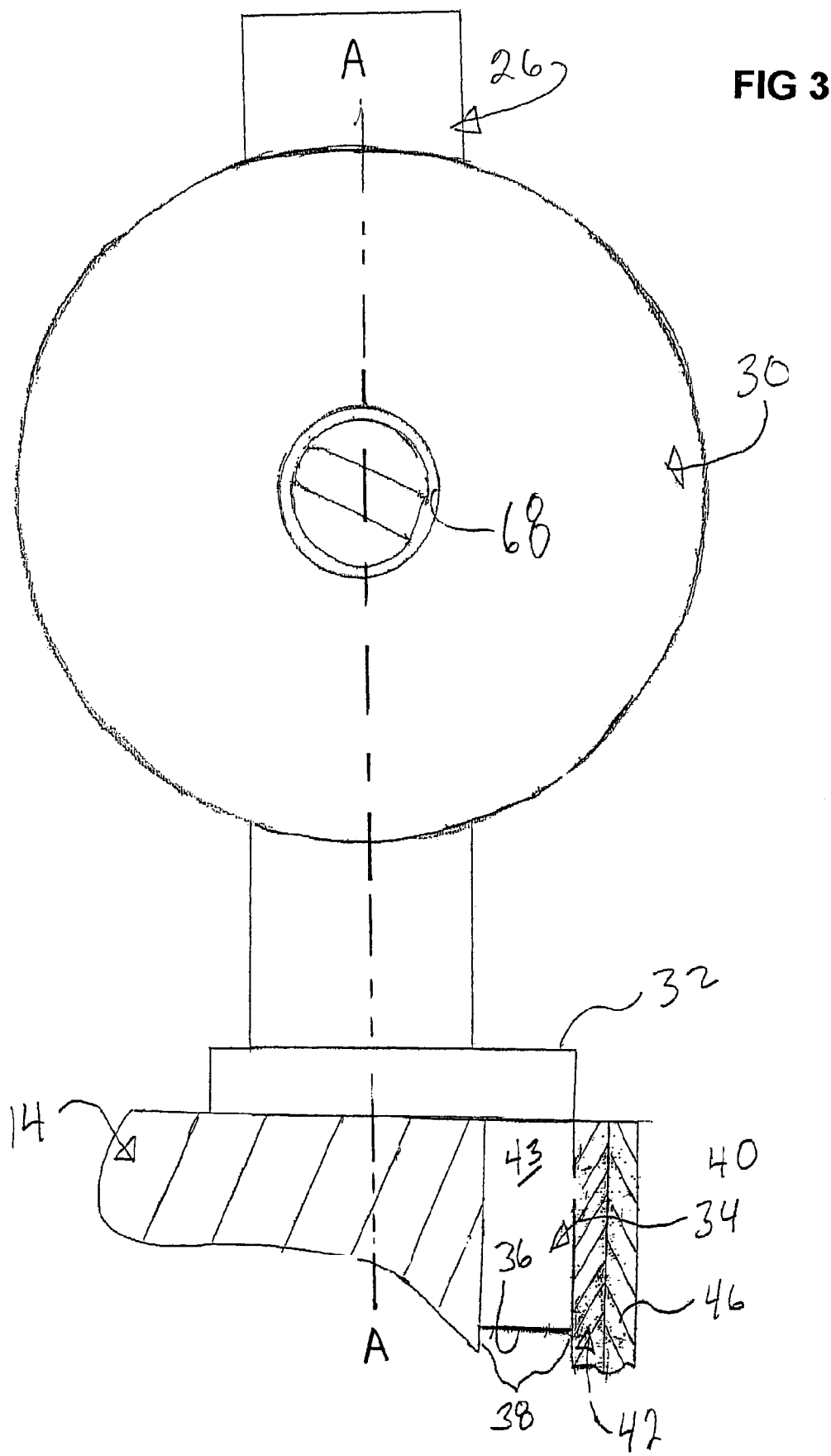
FIG. 3 is a front elevational view of the strap winder of FIG. 1, showing a foot portion of the winder in the mounting bracket.
Figure 4:
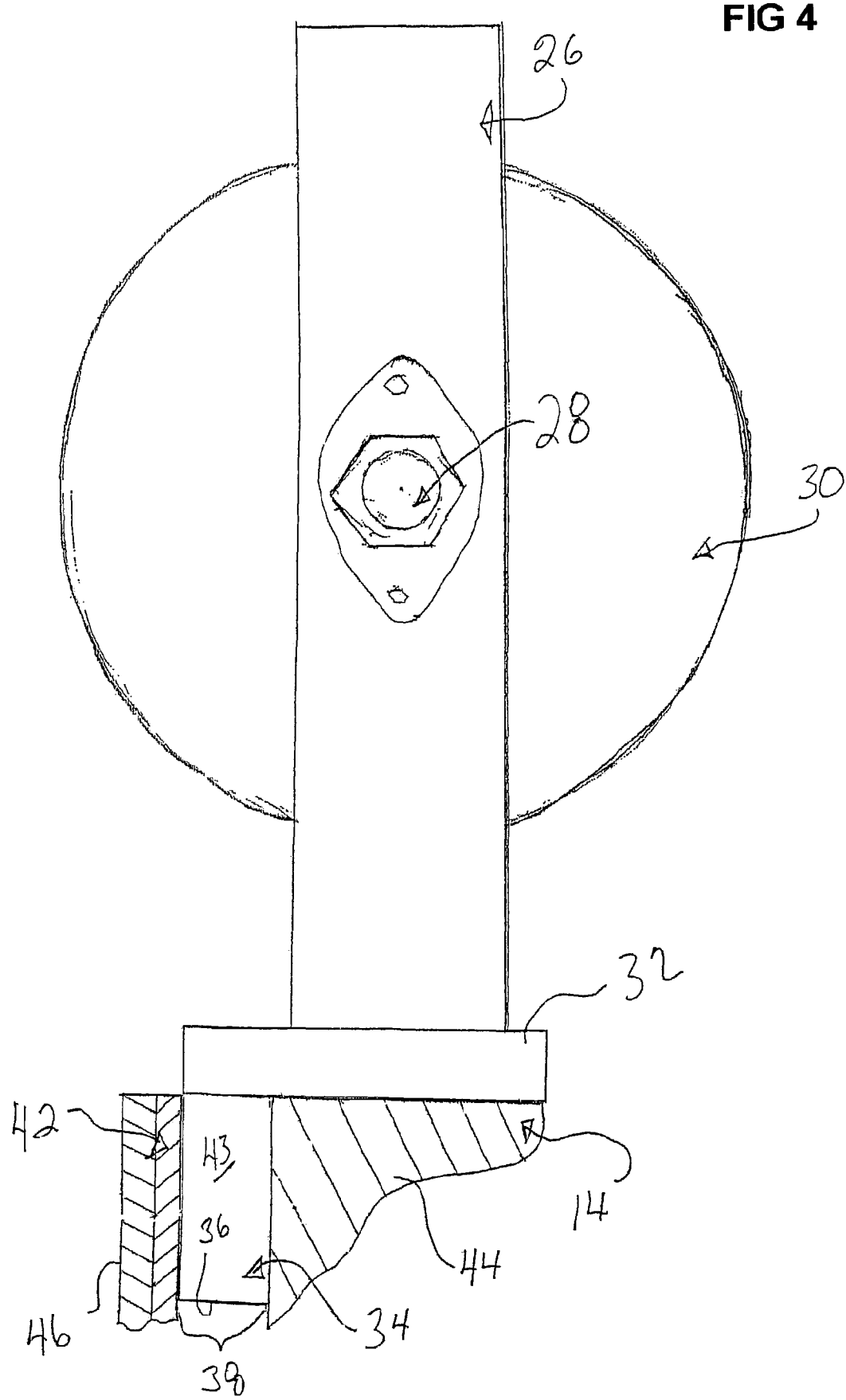
FIG. 4 is a rear elevational view of the strap winder of FIG. 1.

The strap winder 10 of FIG. 1 represents one embodiment of this invention and comprises a body 26, a shaft 28 and a guide plate 30. Referring now also to FIGS. 2 through 4, the body 26 may be comprised of any suitably strong and durable material such as a metal, e.g., steel, aluminum, alloys of aluminum and nickel or other suitable alloys. The body 26 has a generally rectangular shape in cross section, but any suitable configuration may be employed provided that the body suitably supports the shaft 28 and guide plate 30. The body 26 may comprise a mounting plate 32 and, optionally, a foot portion 34 (FIGS. 3 and 4). The mounting plate without the foot portion 34 permits the device 10 to be mounted on, and to extend vertically upward from, a horizontal support surface such as the deck of a truck or trailer. The optional foot portion 34 is preferably configured to be received within a stake hole or support cavity 38 (FIG. 3) of the truck deck 14 and thereby serve to stabilize the position of strap winder 10 on the deck 14. The support cavity, i.e., stake hole 38, may be rectangular (e.g., square) in horizontal cross section and as such may have four interior surfaces, at least three of which may be defined by a bracket 42 (FIGS. 3 and 4), in which case the fourth side is provided by the side of deck 14. The foot portion 34 may be correspondingly rectangular in cross-sectional configuration to be received in, and engage the interior surfaces of, the support cavity 38. It will be understood that other cross-sectional configurations of the support cavity 38 and of the foot portion 34 may be employed in the practice of the present invention. Since the tension on a strap attached to device 10 will, when device 10 is mounted on a truck bed, have a sideward component, foot portion 34 is preferably disposed in an offset position on mounting plate 32, relative to the central longitudinal axis A—A of body 26, as seen in FIG. 3.

The bracket 42 may be secured to a beam 44 of the deck 14 via fasteners (e.g., screws or bolts) or by other means such as welding. A thin beam 46 (shown in FIGS. 2, 3 and 4) may also be provided on the outside of bracket 42 opposite from beam 44 and may be secured to deck 14, to provide support for bracket 42. The mounting plate 32 on strap winder 10 may serve to limit the insertion or movement of the foot portion 34 into the support cavity 38.

The shaft 28 is preferably comprised of a metal such as a steel and is rotatably mounted to the body 26. In particular, the shaft 28 is located in a bore 48 of the body 26 and a pair of bearings 50 (FIGS. 1 and 2) may be fastened to opposing sides of the body 26 to support, and facilitate rotation of, shaft 28 about its longitudinal axis L. A slotted end 52 of the shaft 28 extends through and beyond guide plate 30 from body 26 and comprises a slot 54 that is dimensioned to receive a hook 56 (FIG. 5B) on a cargo strap 58 to be rolled or wound up, or to receive the strap itself. Slot 54 is open at the end of shaft 28 to allow endwise axial insertion of the hook or strap, and the later axial removal of the hook or strap therefrom. It will be appreciated that the hook 56 and strap 58 may be between about two and four inches wide and the strap 58 may be up to about twenty (20) feet long or longer in some instances.

The other end 60 of the shaft 28 is configured to connect with a power-operated driver. For example, the end 60 comprises threads 62 (FIG. 2) to which a drive nut 64 may be fastened. The power-operated driver may then comprise a drive shaft that carries a socket which is sized to engage drive nut 64. Alternatively, end 60 may comprise a chuck, socket, gear, or other means for being engaged by the power-operated driver. Preferably, the power-operated driver can be powered from a truck such as a truck on which the strap winder is mounted. One such power-operated driver is a pneumatic torque wrench 12 (FIG. 1), which is supplied with power from the truck, and is used to apply torque to rotate shaft 28 of the strap winder 10. The pneumatic torque wrench 12 may be typically configured and includes a supply tube 16, a handle 18, a neck 20, a head 22 and a socket 24. The pneumatic torque wrench 12 is shown for illustrational purposes only and it will be appreciated that other power tools such as an electric drill (not shown) having a socket arrangement (also not shown) may be employed in the practice of the present invention, as well as motors, as described below.

The guide plate 30 is generally circular and has a flat surface that faces slot 52a and that is perpendicular to the axis of rotation of shaft 28. Guide plate 30 has a diameter which is at least as large as the diameter of a coil formed by a strap 58 of typical length (see FIG. 5B) about shaft 28 so that during winding of the strap 58, the strap guide plate 30 can help to guide the strap to wind into a neat and even coil, i.e., to prevent telescoping of the coil. For example, guide plate 30 may have a diameter of about from 12 to 18 inches. Optionally, the guide plate 30 may be connected to the body 26 by a pair of support members 66 each of which may be comprised of the same material as the body 26. Guide plate 30 has a central aperture 68 therein through which the shaft 28 extends. The support members 66 may be mounted to the body 26 and the guide plate 30 by any suitable means, e.g., mechanically or by welding. Optionally, the support members 66, guide plate 30 and body 26 may be, for example, cast, molded or machined in one piece. In an alternative embodiment, guide plate 30 may be mounted on, and may rotate with, shaft 28.

Figure 5A:
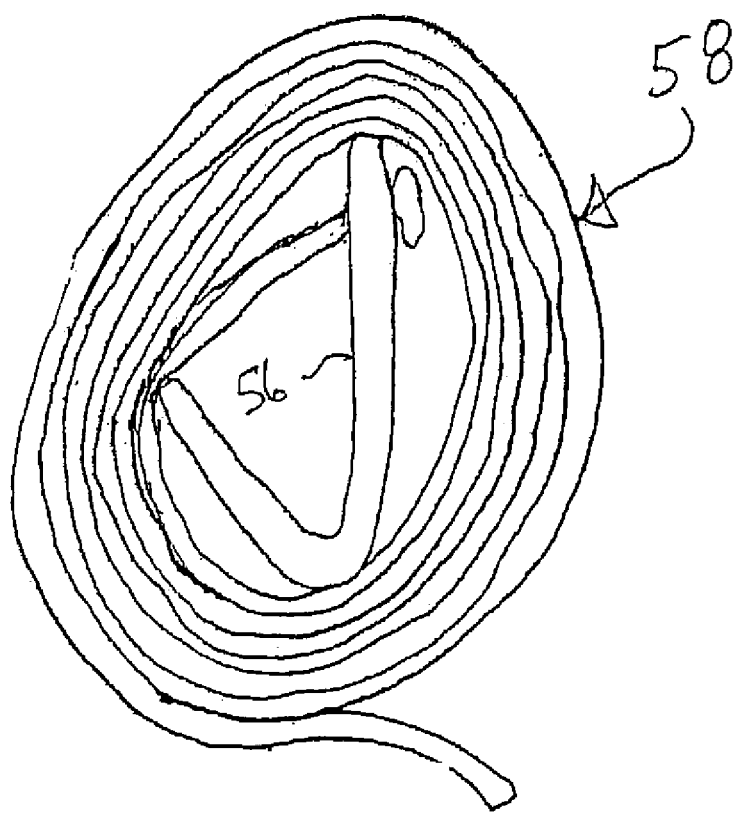
FIG. 5A is a side view of a coiled strap with a hook thereon, as may be removed from the strap winder of FIG. 1.
Figure 5B:
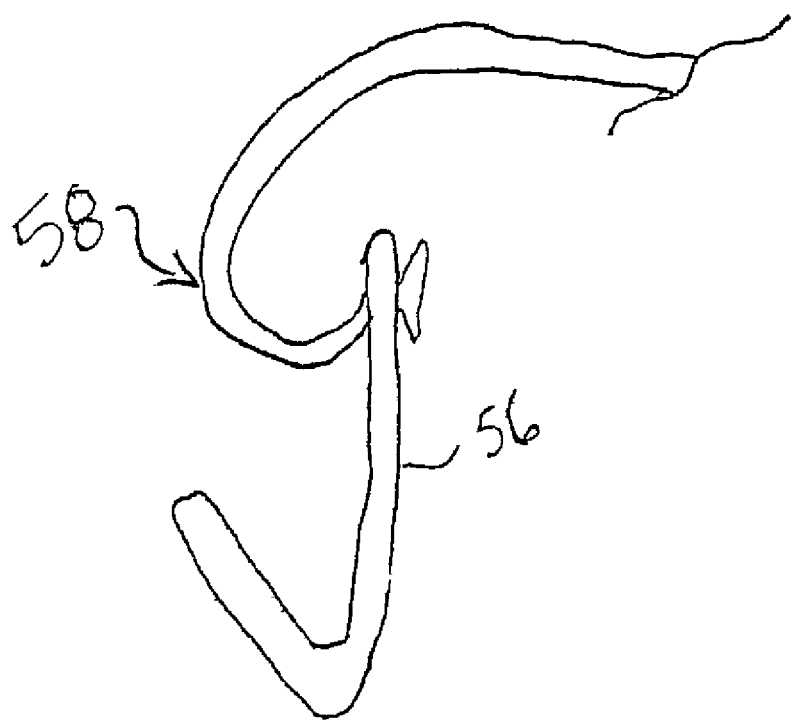
FIG. 5B is a side view of the hook and strap of FIG. 5A in an unrolled state.

In operation, referring now to FIGS. 1, 2, 5A and 5B, a hook 56 of an uncoiled strap 58 (FIG. 5B) may be placed within the slot 54 of the shaft 28 (as shown in FIG. 2). If the strap has no hook, the end of the strap itself can be inserted into slot 54. A socket 24 from a power-operated driver such as a pneumatic torque wrench 12 may be connected to the drive nut 64 (as shown in FIG. 1) of the strap winder 10. The pneumatic torque wrench 12 may then be activated to rotate the shaft 28 and wind the strap 58 thereon. The strap 58 thus forms a coil about strap 28. The coil is removable from shaft 28 because the strap (or hook) in slot 54 can be slid out of the slot and off the shaft. Accordingly, once formed, the coil may then be slid off of the shaft 28 (as shown in FIG. 5A) and stored for future use. It will be appreciated that any suitable device or structure may be used to temporarily secure one end of the strap to the shaft 28, e.g., a spool having a structure thereon to secure one end of the strap, the spool being dimensioned and configured to slip over the shaft and secured thereto. The spool may be removable from the shaft with the coiled strap attached to it.

Figure 6A:
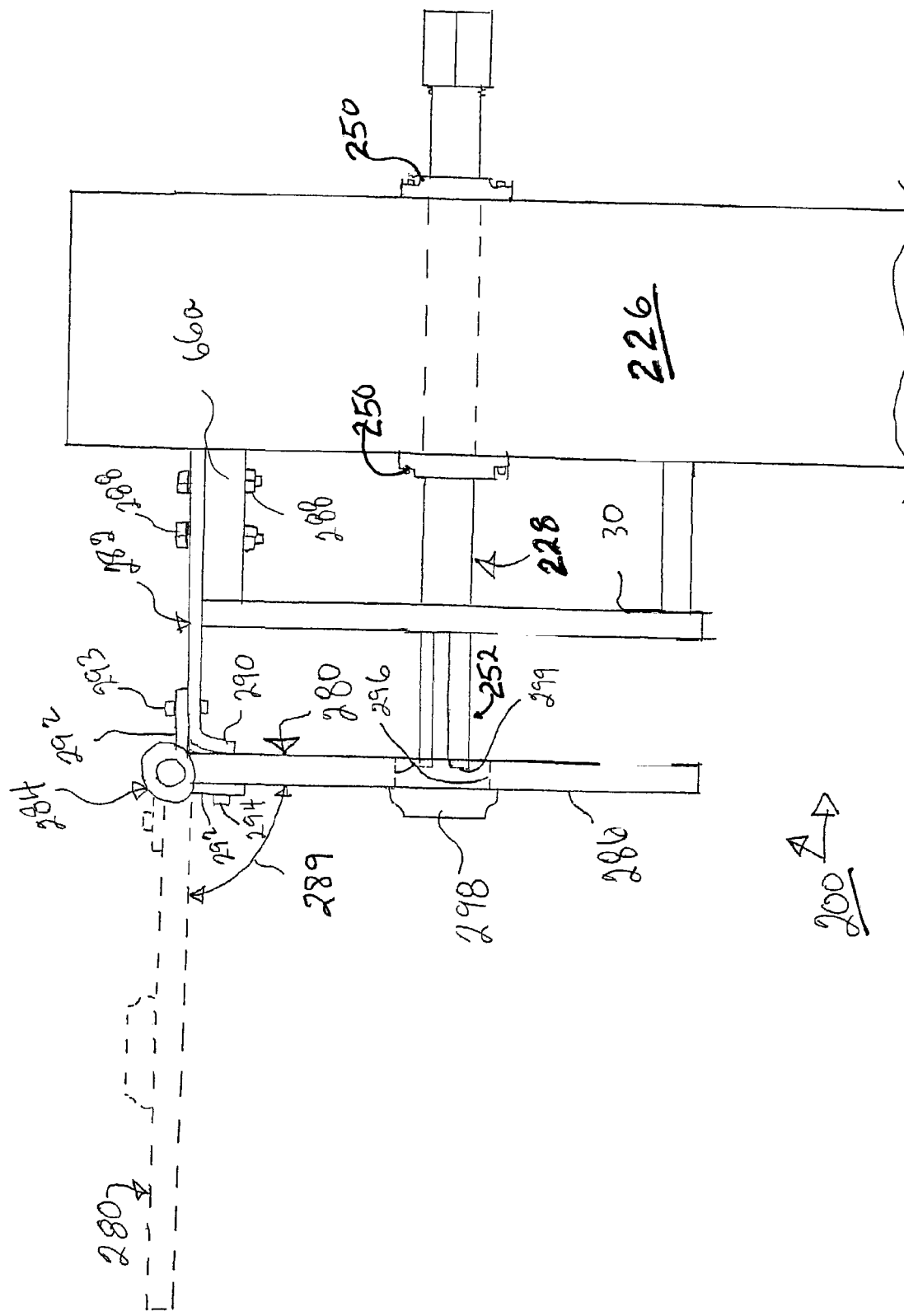
FIG. 6A is a partial side elevational view of a strap winder including a guard in accordance with another embodiment of the present invention.

Another embodiment of a strap winder in accordance with the present invention is partially shown at 200 in FIG. 6A. The strap winder 200 may be similar to the one shown in FIGS. 1 through 4, except that the strap winder of FIG. 6A further comprises a guard plate 286 mounted thereon. It will be understood that the guard plate 286 may be employed with any of the embodiments of FIGS. 1 through 4, and that a description of features similar to those of the other embodiments, and their use, is omitted in connection with FIG. 6A as repetitious and unnecessary for understanding the invention. Some of the parts which are similar or identical to those of the embodiments of FIGS. 1–4 are identically numbered as in those Figures except for the addition of a lead digit or a suffix letter.

The guard plate 286 is mounted on body 226 by a mounting bracket 282 and a hinge mechanism 284 which together constitute a guard assembly 280. The mounting bracket 282 is preferably composed of a metal for strength and durability and may be mounted, e.g., by fasteners 288, to a support member 66a. The mounting bracket 282 preferably comprises a stop portion 290. The guard plate 286 is attached to a mounting bracket 282 by the hinge mechanism 284.

The hinge mechanism 284 includes plates 292 and may be fastened to the mounting bracket 282 by a fastener 293 and to the guard plate by a fastener 294. Hinge mechanism 284 is preferably a known spring-loaded type, such as those readily available for use as door hinges, and functions to provide for pivotal movement of the guard plate 286 in the direction of arrow 289 while biasing the guard plate 286 to rest against the stop portion 290, in which position guard plate 286 is generally parallel to guide plate 230. The guard plate 286 may be similar in configuration and composition to guide plate 230 and preferably has an optional, centrally disposed aperture 296 and a cap 298. The aperture 296 is dimensioned to receive therein the outer end 299 of shaft 228. The cap 298 may be comprised of a synthetic polymeric material and functions to cover the outer end 299 that may protrude through the aperture 296 in guard plate 286, and thus protect the user against inadvertent contact with the end of the rotating shaft 228.

While guard plate 286 is at rest in the position shown in FIG. 6A (the "safety position"), it provides protection against inadvertent user contact with the rotating shaft 228 and the strap coil building thereon. Shaft 228 is carried in bearings 250. Once the strap is wound about shaft 228, guard plate 286 can be raised to its horizontal position (the "access position" shown in dotted outline) so that it will not interfere with removal of the strap from shaft 228.

In use, a strap end or a hook or other structure at one end of the strap may be secured to shaft 228 in any suitable way, e.g., in slot 252, just as for strap winder 10 (FIGS. 1 through 4), or otherwise. This may be done either while guard plate 286 is in the safety position or while it has been lifted to the access position. The guard plate 286 is then placed in the safety position while shaft 228 is rotated to coil the strap thereon. Once the strap is fully coiled, the guard plate 286 may be pivoted from the safety position shown in solid line to the access position shown in broken line, and the coil may be slid off the end of shaft 228. The guard plate 286 functions to prevent injury to the user by preventing hand contact with the rotating shaft 228 and with the growing coil of a strap 58. Also, the guard plate 286, alone or in combination with the guide plate 230, may assist in guiding a strap during winding or coiling to help prevent telescoping of the coil. After the coil is removed from the shaft, the device can be used to wind another strap.

Figure 6B:
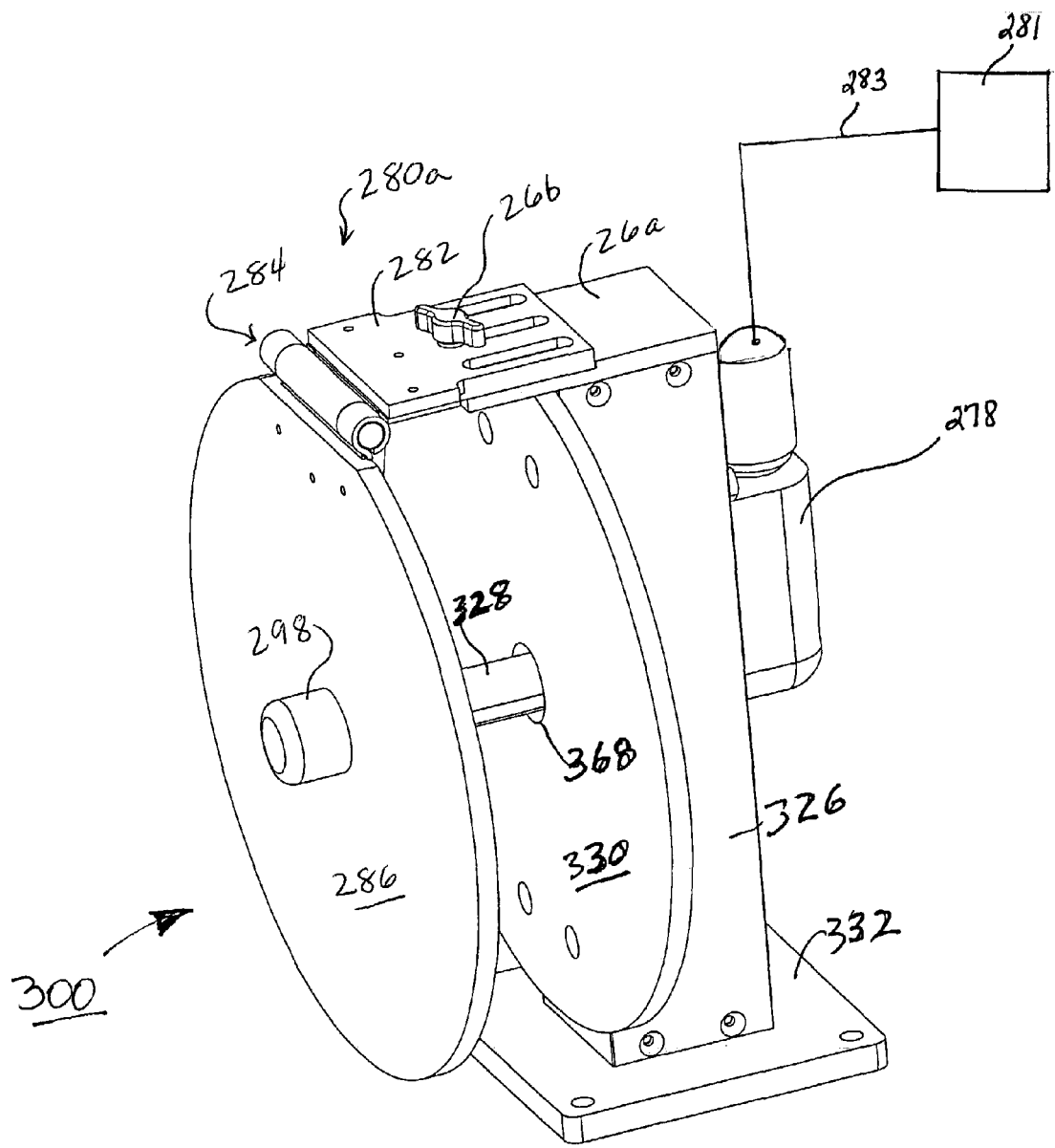
FIG. 6B is a perspective view of a strap winder with a guard in accordance with yet another embodiment of the present invention.

In a similar but alternative embodiment, a powered strap winder 300 shown in FIG. 6B comprises a body 326 on a mounting plate 332, on which a shaft 328 is rotatably mounted. Shaft 328 is drivingly connected to a motor 278 which may be an electrical motor, a pneumatic motor or a hydraulic motor. A power source 281 is schematically shown as being connected to motor 278 by a line 283. Power source 281 may comprise a hand-held power tool or it may comprise any suitable source of compressed air, such as the pneumatic braking or other pneumatic system of a vehicle, a source of hydraulic liquid, such as the hydraulic braking or other hydraulic system of a vehicle, or a source of electrical energy such as the electrical system of a vehicle. Line 283 is a line such as electrical conduits or a pipe or hose suitable for transmitting energy from the power source 281 to the motor 278.

In this embodiment, guide plate 330, which has therein a central aperture 368 through which shaft 328 passes, is mounted directly to body 326, without intervening support members such as support members 66 shown in FIGS. 1 through 4. Strap winder 300 also comprises a top plate 26a mounted on the end of body 326 on the end thereof which is opposite from mounting plate 332. A guard mechanism 280a is mounted on top plate 26a and comprises a guard plate 286 which is attached via a hinge mechanism 284 to a mounting bracket 282. Mounting bracket 282 is a slotted member which is secured to top plate 26a via a lock nut 26b. Guard plate 286 has therein a central aperture (not shown) and carries on its outside surface a hollow cap 298 which is concentric with and covers the aperture (not shown). The aperture in guard plate 286 and the slot and lock nut engagement between guard mechanism 280a and top plate 26a, serve to adjustably mount guard plate 286 on strap winder 300 so that guard plate 286 can be set in the safety position at a variety of axial distances along the shaft 328 from guide plate 330. Hollow cap 298 is made long enough to accommodate the desired length of travel of guard plate 286 along shaft 328. When guard plate 286 is positioned with the end of shaft 328 protruding into the guard plate central aperture and cap 298, guard plate 286 can cooperate with guide plate 330 to neatly coil straps that are not as wide as the strap-receiving portion of shaft 328 is long. Typically, the strap is mounted on shaft 328 with one edge close to or abutting guide plate 330, and guard mechanism 280a is positioned so that guard plate 286 is close to or abutting the other edge of the strap. The lock nut 26b is then used to secure guard mechanism 280a in position.

Figure 7:
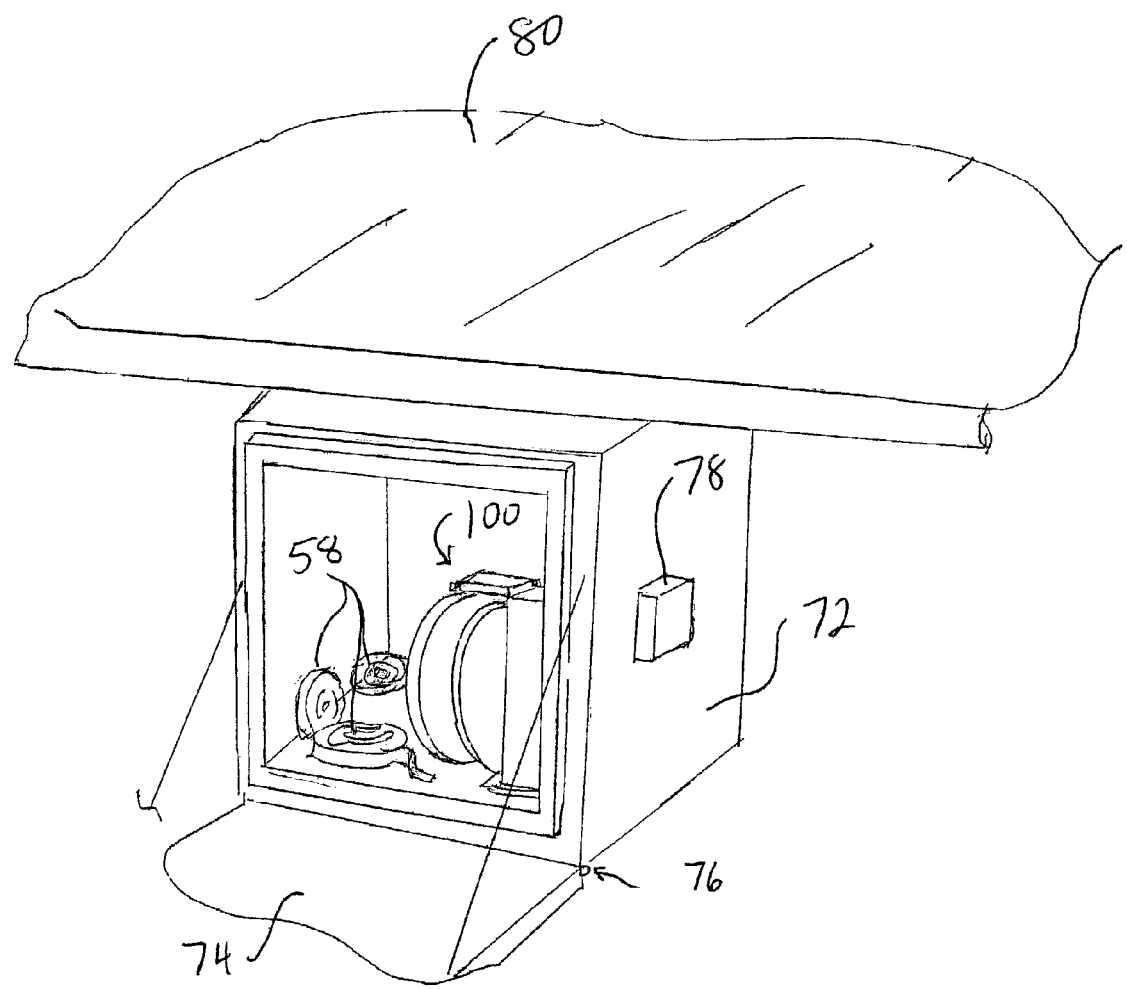
FIG. 7 is a perspective view of a strap winder mounted within a container beneath a truck flat bed in accordance with another aspect of the present invention.

As shown in FIG. 7, a strap winder assembly according to this invention may comprise a container 72 having a cover 74 that is connected to the container by hinges 76 to house a strap winder 100. Preferably, container 72 is a lockable, weather-sealed (e.g., by weather stripping around the opening of the container for contact with the cover) box formed from any suitable material, such as heavy-gage, reinforced aluminum. Optionally, the strap winder 100 may be any of those previously described herein, although, rather than including a foot portion 34 (FIG. 3), the strap winder 100 may be mounted to the container 72 via fasteners through a mounting plate like mounting plate 32 (FIG. 1). The container 72 may be mounted on the underside of the truck bed 80, where it permanently situates winder 100 at a useful position without taking up cargo space on the flat bed. Container 72 is preferably sized to allow the user to store a plurality of cargo straps 58 beside the winder, for future use. Preferably, any power attachments needed for the operation of the winder are made available through the container wall via a coupler 78 to which winder 100 is connected. For example, if the winder is configured to be driven by a torque wrench or the pneumatic, electrical or hydraulic system of the vehicle comprised of truck bed 80, coupler 78 could comprise any suitable pneumatic, electrical or hydraulic coupler to which the power source may be connected by suitable lines, hoses or the like, from outside the container wall to provide pressurized air, hydraulic fluid or electrical energy to power the strap winder 100. For example, if the strap winder 100 is powered by an electric motor, coupler 78 could comprise an electrical plug to which an electrical power supply line can be connected from outside the container.

While the invention has been described with reference to particular embodiments, one of ordinary skill in the art, upon a reading and understanding of the foregoing descriptions, will appreciate that numerous variations and alterations to the described embodiments will fall within the spirit of the invention and the scope of the following claims.

What is claimed is:

1. A strap winder which is dimensioned and configured to be mounted on a vehicle, the strap winder serving to wind an elongated strap into a coil and comprising:

a body;

a one-piece shaft rotatably supported by the body, the shaft having a longitudinal axis and a slotted end and being dimensioned and configured to receive the strap for winding it about the shaft, the slotted end being defined by a slot extending parallel to the longitudinal axis of the shaft, the slotted end being dimensioned and configured to retain an end of the strap and to allow the strap formed into a coil on the shaft to be removed from the shaft by axially translating the formed coil over the slotted end;

a power-operated driver comprising an electric motor connected to the shaft to rotate the shaft about its longitudinal axis; and a power connector on the strap winder to connect the power-operated driver to a power source comprising a battery-containing electrical system associated with such vehicle, whereby to rotate the shaft to coil the strap onto the shaft.

2. The strap winder of claim 1 in combination with the vehicle, wherein the strap winder is mounted on the vehicle.

3. A strap winder which is dimensioned and configured to be mounted on a vehicle, the strap winder serving to wind an elongated strap into a coil and comprising:
   a body;
   a one-piece shaft rotatably supported by the body, the shaft having a longitudinal axis and a slotted end and being dimensioned and configured to receive the strap for winding it about the shaft, the slotted end being defined by a slot extending parallel to the longitudinal axis of the shaft, the slotted end being dimensioned and configured to retain an end of the strap and to allow the strap formed into a coil on the shaft to be removed from the shaft by axially translating the formed coil over the slotted end;
   a power-operated driver connected to the shaft to rotate the shaft about its longitudinal axis; and
   a power connector on the strap winder to connect the power-operated driver to a power source whereby to rotate the shaft to coil the strap onto the shaft;
   wherein the power-operated driver is a pneumatic motor.

4. The strap winder of claim 3 in combination with the vehicle, wherein the power source comprises a pneumatic system associated with the vehicle, and the strap winder is mounted on the vehicle.

5. A strap winder which is dimensioned and configured to be mounted on a vehicle, the strap winder serving to wind an elongated strap into a coil and comprising:
   a body;
   a one-piece shaft rotatably supported by the body, the shaft having a longitudinal axis and a slotted end and being dimensioned and configured to receive the strap for winding it about the shaft, the slotted end being defined by a slot extending parallel to the longitudinal axis of the shaft, the slotted end being dimensioned and configured to retain an end of the strap and to allow the strap formed into a coil on the shaft to be removed from the shaft by axially translating the formed coil over the slotted end;
   a power-operated driver connected to the shaft to rotate the shaft about its longitudinal axis; and
   a power connector on the strap winder to connect the power-operated driver to a power source whereby to rotate the shaft to coil the strap onto the shaft;
   wherein the power-operated driver is a hydraulic motor.

6. The strap winder of claim 5 in combination with the vehicle, wherein the power source comprises a hydraulic system associated with the vehicle, and the strap winder is mounted on the vehicle.

7. The strap winder of any one of claims 4, 2 and 6 wherein the strap is a cargo strap.

8. The strap winder of any one of claims 4, 2 or 6 wherein the vehicle is a truck and the elongated strap is a cargo strap.

9. A strap winder which is dimensioned and configured to be mounted on a vehicle, the strap winder serving to wind an elongated strap into a coil and comprising:
   a body;
   a one-piece shaft rotatably supported by the body, the shaft having a longitudinal axis and a slotted end and being dimensioned and configured to receive the strap for winding it about the shaft, the slotted end being defined by a slot extending parallel to the longitudinal axis of the shaft, the slotted end being dimensioned and configured to retain an end of the strap and to allow the strap formed into a coil on the shaft to be removed from the shaft by axially translating the formed coil over the slotted end;
   a power-operated driver connected to the shaft to rotate the shaft about its longitudinal axis; and
   a power connector on the strap winder to connect the power-operated driver to a power source whereby to rotate the shaft to coil the strap onto the shaft, the strap winder being in combination with a vehicle comprising a truck trailer and a truck cab, and wherein the strap winder is mounted on the truck trailer.

10. A strap winder in combination with a vehicle on which the strap winder is mounted, the strap winder being for winding an elongated strap into a coil and comprising:
    a body;
    a one-piece shaft rotatably supported by the body, the shaft having a longitudinal axis and a slotted end and being dimensioned and configured to receive the strap for winding the strap about the shaft, the slotted end being defined by a slot extending parallel to the longitudinal axis of the shaft, the slotted end being dimensioned and configured to retain an end of the strap and to allow the strap formed into a coil to be removed from the shaft by axially translating the formed coil over the slotted end;
    a guide member mounted to one of the body and the shaft and having a guide surface disposed in generally perpendicular relation to the longitudinal axis of the shaft, the guide surface of the guide member extending at least to the slot to contact an edge of the strap being wound into the coil to form an edge of the coil coplanarly with the guide surface; and
    a power-operated driver connected to the shaft to rotate the shaft about its longitudinal axis,
    wherein the vehicle has a power source selected from the class consisting of a pneumatic system, a battery-containing electrical system, and a hydraulic system, and the power source is connected or connectible to the power-operated driver.

11. The strap winder of claim 10 wherein the guide member comprises a guide plate and the strap winder further comprises a guard plate mounted thereon generally parallel to the guide plate and spaced therefrom to receive the elongated strap between the guard plate and the guide plate.

12. The strap winder of claim 11 wherein the guard plate is pivotably mounted for pivoting movement between (1) a safety position in which it is in parallel, spaced relation to the guide plate, and (2) an access position in which it is withdrawn from its safety position to permit removal from the strap winder of a strap coiled about the shaft.

13. The strap winder of claim 11 or claim 12 wherein the guard plate is adjustably mounted on the strap winder whereby the axial distance along the shaft between the guard plate and the guide plate can be varied.

14. The strap winder of claim 10 wherein the guide member has a diameter of from about 12 to 18 inches.

* * * * *